May 2, 1944. W. J. CRITES 2,347,769
SECONDARY RECOVERY APPARATUS
Filed Sept. 27, 1941
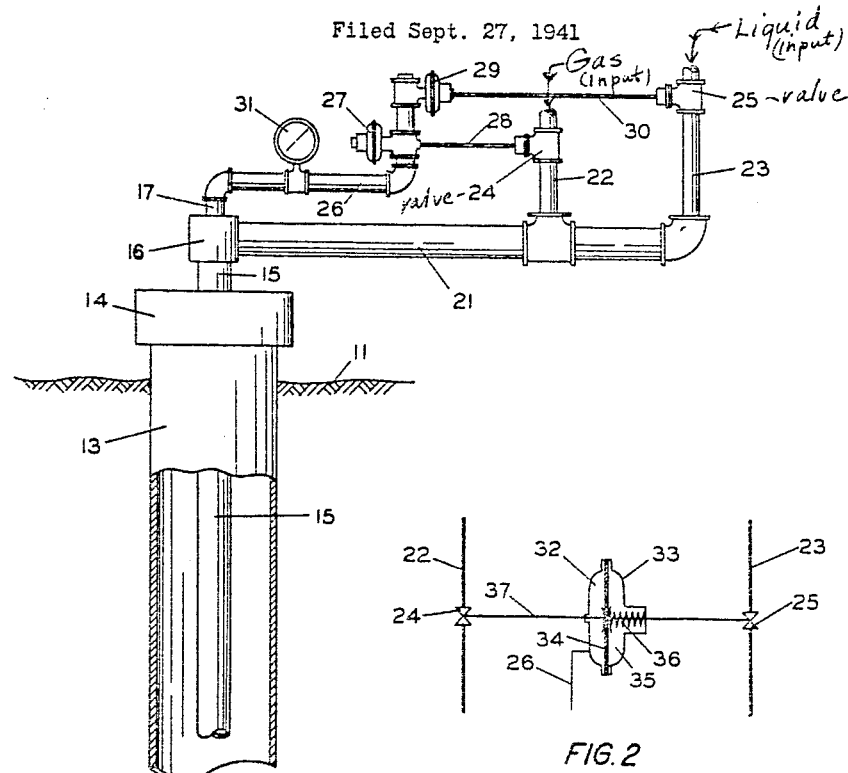
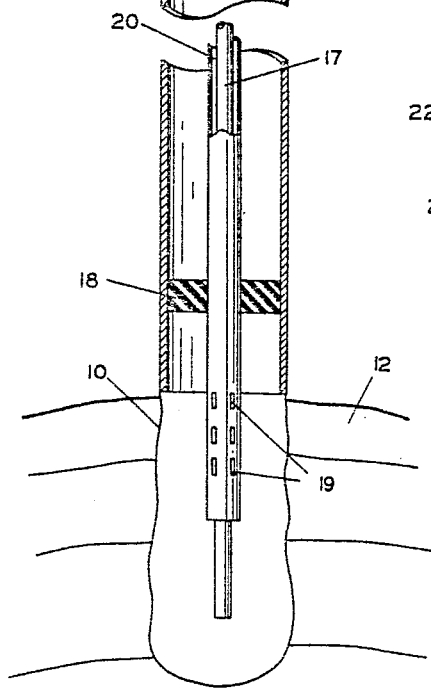
FIG.1
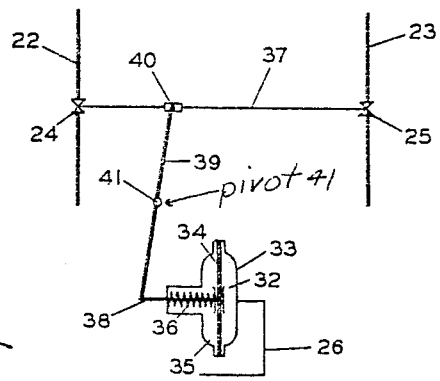
FIG.2
FIG.3
INVENTOR
W. J. CRITES
BY Hudson, Young, Shanley & Ginger
ATTORNEY Patented May 2, 1944

2,347,769

UNITED STATES PATENT OFFICE 2,347,769

SECONDARY RECOVERY APPARATUS

Wilbur J. Crites, Bartlesville, Okla., assignor to Phillips Petroleum Company, a corporation of Delaware Application September 27, 1941, Serial No. 412,646

8 Claims. (Cl. 166—5)

This invention relates to the recovery of hydrocarbon fluids from underground reservoirs, and more particularly to apparatus for recovering hydrocarbon fluids from partially depleted reservoirs. By the practice of this invention, hydrocarbon fluid may be recovered from partially depleted reservoirs through the introduction of fluids of widely differing characteristics, such as water and gas, thereinto. The varying permeability of the reservoir acts as a selective agent in choosing the proper fluid or combination of fluids to enter each specific part of the reservoir, so that the maximum driving effect of the fluids introduced may result.

It is common practice in the art of recovering hydrocarbon fluids from underground reservoirs to inject water or gas into the reservoir in order to sustain or increase the rate of production of hydrocarbon oil from output wells. Within the past few years, there have been cases in which water has been introduced into a reservoir which is being stimulated by gas injection. Such water has the effect of entering the more permeable zones; thus, lowering the permeability of that zone to gas and thereby reducing the by-passing effect which is one of the objectionable features in the recovery of oil by gas drive. Also, cases are known in which gas has been injected in a reservoir subjected to water drive for the purpose of reducing water by-passing. Each of these procedures is effective in accomplishing the purpose for which it is intended.

Since the stimulation or increase of recovery from reservoirs involves the movement of the desirable fluid to be obtained therefrom and of the agent that is injected for the purpose of accomplishing such results; and, since permeability is a major reservoir characteristic which influences the movement of such fluids, permeability and the range in degree thereof is the dominant factor in controlling the path which such fluids may take. Quite frequently, the range in permeability is of such magnitude that any agent that is introduced for the purpose of stimulating or increasing oil recovery will travel to the zones of higher permeability, leaving the zones of lower permeability untouched, or only slightly affected. When such conditions occur, the introduced agent often acts against the drainage of oil into the more permeable zones, resulting in less oil recovered than if the agent had not been introduced. Thus, it is obvious that the more uniform the permeability of a reservoir, the more uniform the advance of the introduced fluid upon the fluid to be recovered. So, for the purpose of reducing the range of permeability, I propose to introduce to the reservoir controlled volumes of two fluids of widely varying characteristics, one a liquid, the other a gas; such as water and natural gas, either simultaneously or by intermittent slugs, and in so doing, effect both a liquid and a gas drive. As a result of this method of introduction, liquid associated with some gas, will predominantly enter the zones of higher permeability, and the gas, associated with some liquid, will enter the zones of lower permeability. The permeability of zones of higher permeability will be reduced by the accumulation and adsorption of water and gas to a greater degree than the permeability of zones of lower permeability, resulting in more uniform effective permeability throughout the reservoir.

In this invention, I am relying upon two physical fundamentals: First, gas associated with a liquid decreases the effective permeability of the formation through which such composite fluid flows. Second, gas absorbed in a liquid reduces its viscosity and adhesion characteristics. Further, in formations of high permeability, the resistance to flow of gas and liquid, or conversely, what might be called the penetration characteristic, is of substantially the same order. However, as the permeability decreases, the differential of the penetration characteristics becomes greater in favor of the gas until the degree of permeability reaches the capillary range, in which range the penetration characteristic of the liquid predominates.

The efficient and effective recovery of the fluid from a reservoir through the use of an introduced agent depends upon maintaining, as nearly as possible, a uniform and unbroken interfacial relationship between the fluid to be recovered and the introduced agent. In a natural accumulation of oil in a reservoir, this interfacial relationship has been accomplished by the time factor in which differential gravitational forces have caused an effective segregation of oil, water, and gas. The difficulty in maintaining this gravitational relationship in the artificial stimulation of recovery lies in the fact that the time element is reduced by economic requirements to the point that, if sufficient force is applied to obtain a profitable rate of production, the interfacial relationship is broken down, resulting in leaving a considerable amount of fluid in the reservoir that would not have been left had there been less force applied. Since economic requirements will not allow the time to be extended in sufficient degree to meet such requirements, another approach to the solution of the problem must be made.

It is axiomatic that the more readily the fluid that is to be recovered moves in the reservoir, and the more readily such fluid separates itself in the reservoir rock, the easier it is to recover, and the greater the amount that will be recovered.

It is equally true that the more uniform the advance of the injected fluid, the more effective the driving action will be on the fluid that is to be recovered.

There are two characteristics of reservoir fluids that predominantly offer resistance to flow in a reservoir: viscosity and adhesion: the first, a characteristic of the fluid itself; the second, an inter-relational characteristic of the fluid and the reservoir rock. There is one characteristic that predominantly contributes to non-uniformity of advancement: Permeability differential. It, therefore, follows that if the fluid introduced has such inherent qualities that it may impart to the fluid that is to be recovered characteristics that will cause a reduction in viscosity and adhesion tension, and, at the same time, retain to itself such characteristics that will cause it to present a more uniform advance along the line of interfacial contact, the fluid to be recovered from the reservoir may be increased by the use thereof.

From the foregoing description of the relative penetration characteristics of gas and liquid to formations of varying permeability, it may be seen the formations are selective in their receptions of gas and liquid and that this selection is a function of permeability. Also, it may be seen that the zones of lower permeability which have retained the greater amounts of oil will receive selectively, the greater relative amounts of gas, and as the gas so received will, under pressure, be at least in part absorbed by the oil and the oil thus affected will adhere less tenaciously to and move more readily through the formation. Further, it may be seen that the zones of higher permeability which retain the lesser amounts of oil will receive selectively greater relative amounts of liquid, and although the gas will have the effect of causing the oil, through absorption, to flow more freely, the composite injected fluid of gas and liquid will be retarded in its movement on account of the effect of such fluid on the effective permeability of the formation. Further, since the relative volumes of gas and liquid that will be introduced in the formation are a result of selectivity, and are functions of relative degree of permeability, the relative volumes of each will be controlled at the surface, either by volumetric measurement by standard meter, or by intermittent time-clock operation of a control valve.

It must be understood that this invention relates not to the control of specific amounts of fluid, but the relative amount of fluids in their introduction into oil reservoirs for the purpose of stimulating and increasing the recovery of oil therefrom.

For this purpose, the proper relationship of introduced gas and liquid may be observed or recorded and controlled by the use of an instrument responsive to pressure changes installed in the introductory well at a point adjacent to or near the formation in which the gas and liquid are introduced and connected with, at the surface, means for indicating or recording pressure changes. While it is desirable to control this relationship connected at the surface with differential actuating means, so that the relative amounts of gas and liquid may be changed thereby, this means is automatic in its operation as long as sufficient amounts of total fluid is introduced to the reservoir. For instance, if too much liquid is being introduced, the pressure will increase; and, conversely, if too much gas is being introduced, the pressure will decrease. So, in the operation of the mechanism, as set forth above, the proper relationship will be maintained at all times if the optimum pressure at the reservoir face is maintained. The optimum pressure is that which will show the least variation.

The primary object of my invention is to provide apparatus for recovering hydrocarbon fluids from partially depleted hydrocarbon-bearing reservoirs.

Another object of my invention is to provide apparatus for injecting controlled quantities of a plurality of fluids into a hydrocarbon-bearing reservoir through an input well.

A further object of my invention is to provide apparatus for injecting a gas and a liquid into a partially depleted hydrocarbon-bearing reservoir through an input well to effect a combination gas and liquid drive. My apparatus operates to inject a desired volumetric proportion of gas to liquid as predicated by the actual reservoir conditions, and as controlled by the pressure of the injected fluids at the bottom of the input well.

These and additional objects and advantages will be apparent to persons skilled in the art by reference to the following description and annexed drawing wherein Figure 1 is an elevation view of my invention, partly in cross section;

Figures 2 and 3 are fragmentary views of my invention, partly in cross section illustrating modifications of the surface control equipment, which may be employed advantageously.

Referring to the drawing and more particularly to Figure 1, I have denoted therein an input well bore by reference numeral 10. Well bore 10 extends downwardly from the surface of the ground 11 into a hydrocarbon-bearing formation 12. Fluids injected into formation 12 through input well 10 urge hydrocarbon oil toward one or more output wells (not shown). The well bore contains a casing 13, which is cemented therein after a manner well known to the art, and which has a closure 14 secured to the top. The closure, in addition to sealing the casing, provides a means of supporting tubing 15 concentrically within casing 13. A tubing closure 16 which is secured to the top of tubing 15 supports a second string of tubing 17 concentrically within tubing 15. Tubing 17 preferably extends below the bottom of tubing 15. It will be noted that a packer 18 is mounted concentrically on tubing 15 and is positioned in the lower portion of the casing in order to confine the injected fluids to the lower portion of well 10 opposite formation 12. Tubing 15 is coupled at the bottom to tubing 17 and perforated at 19. The coupling of tubing 15 to tubing 17 is mainly a safety feature in the event the inner string of tubing should part. An annular space 20, formed by tubing 15 and tubing 17, communicates with separate supply sources of liquid and gas (not shown) through a conduit 21, which connects with tubing 15 through tubing head 16, and a pair of branch conduits 22 and 23, having valves 24 and 25, respectively, for controlling the flow of fluid therethrough. For purposes of illustration, let us assume that branch conduit 22 conveys gas from the source of gas supply to conduit 21, and conduit 23 conveys liquid from the source of liquid supply. The opening and closing of the valves is accomplished by utilizing the pressure in tubing 17. Tubing 17 is connected at the top to a pipe 26 which is provided with a pressure responsive diaphragm motor 27, which in turn is connected to valve 24 by a rod 28. A second pressure responsive diaphragm motor 29, which is connected to valve 25 by a second rod 30, is also provided on pipe 26. A pressure gauge 31 is positioned on conduit 26 to indicate or record the pressure in tubing 17. It is to be understood that while I have shown diaphragm motors 27 and 29 for actuating valves 24 and 25, any other means which is responsive to the pressure in the bottom of borehole 10 may be used successfully to actuate these valves.

Turning next to Figures 2 and 3, wherein like numerals refer to identical parts shown in Figure 1, I have illustrated two modifications of the apparatus for actuating valves 24 and 25. Referring specifically to Figure 2, it will be noted that pipe 26 communicates with a fluid chamber 32 which is formed in a diaphragm housing 33 between one side of the housing and a diaphragm 34. Diaphragm 34 and the other side of the housing form a spring chamber 35 which is open to the atmosphere. A compression spring 36 of any desired strength is positioned in chamber 35 between diaphragm 34 and the diaphragm housing concentric with a slidable rod 37 which connects the diaphragm to valves 24 and 25. It is to be understood that the term "rod" is to be construed to mean a connecting means whereby both valves 24 and 25 are simultaneously responsive to the movement of diaphragm plate 34. Actually, rod 37 may consist of two parts, one of which is secured to one side of diaphragm 34 and to valve 24, and the other to the opposite side of diaphragm 34 and to valve 25. The apparatus shown in Figure 3 is very similar to that illustrated in Figure 2. In this modification, however, rod 37, while directly connected to valves 24 and 25, is not directly connected to diaphragm 34. Spring 36 is positioned in chamber 35 concentric with a stem 38 which is secured to diaphragm 34 and which extends through the diaphragm housing to attach with a lever 39. The other end of lever 39 is connected to rod 37 at 40. It will be noted that the connection of lever 39 with stem 38 and with rod 37 is of the type which allows free movement of the lever about a pivot 41.

In the operation of my instant invention, the apparatus is assembled as illustrated in Figure 1. Let us assume, first, that a composite fluid, such as one consisting of natural gas and water, is being injected into formation 12, which is partially depleted of its hydrocarbon oil; second, that the reservoir rock is one of non-uniform permeability having portions thereof of high permeability and portions of low permeability, and third, that the formation is a type in which the injected water mainly enters the highly permeable formation with some gas, while the gas mainly enters the less permeable formations with some water.

It will be noted that a uniform permeability facilitates the secondary recovery of hydrocarbon oil from the formation as the injected fluids urge the oil toward the output wells at a uniform rate of advancement, and that by injecting fluids into the reservoir, which tend to make the effective permeability more uniform, the recovery of hydrocarbon oil therefrom will be greatly increased. Gas under a predetermined pressure is conveyed from the source of supply to conduit 21 through branch conduit 22, as allowed by valve 24, and water under an equivalent pressure is conveyed to conduit 21 through branch conduit 23, as allowed by valve 25. The gas and water leave conduit 21 and flow through tubing closure 16, annular space 20, and perforations 19 where the gas and water enter well bore 10. The hydrostatic pressure of the fluid column in addition to the pressure placed on the fluids at the surface of the ground causes the fluids to leave well bore 10 and to enter formation 12 where the fluids urge hydrocarbon oil toward the output wells. It will be noted that when fluid is being injected into formation 12 that the lower end of tubing 17 is submerged in fluid, which enters the lower end of tubing 17 where the fluid serves as a movable plug. As the tubing is sealed at the top after assembly in the well bore, it will contain a compressible fluid. This fluid may be partially air and partially gas or, if desired, the air may be forced from the tubing prior to the sealing at the surface of the ground and the tubing filled with natural gas. The pressure of the fluid in well bore 10 below packer 18 is transmitted through the gaseous medium in tubing 17 and pipe 26 to diaphragm motors 27 and 29. This pressure is indicated on gauge 31. As diaphragm motors 27 and 29 are responsive to the pressure in pipe 26, valves 24 and 25, which are respectively connected thereto by rods 28 and 30, are also responsive thereto. (This pressure is an indication of the pressure in well bore 10, and hence the volumes of gas and water, which are injected into the formation are controlled by the pressure in the bottom of bore hole 10. As gas and water are injected into input well bore 10 and hydrocarbon oil is urged through the formation toward the output wells, the relative volume of gas to water injected into the formation to accomplish the desired composite fluid drive will vary as predicated by the permeability of the reservoir rock, which has been found to vary appreciably through the lateral extent of hydrocarbon-bearing formations. These variations in the permeability of the reservoir affect the fluid drive as the hydrocarbon oil is removed progressively outward from the input well, necessitating a change in the amounts of gas and water being injected into formation 12. For example, if the formation is of a type which allows the flow of gas more readily than the flow of water, excessive injection of water into the well bore increases the pressure in bore hole 10 whereupon the fluid in the bore hole enters the lower end of tubing 17, compressing the gas already in the tubing. The pressure change acting through the compressible fluid in tubing 17 and pipe 26 is indicated on gauge 31 and the pressure in pipe 26 acts upon the diaphragm motors. Diaphragm motor 29 causes rod 30 to move to the right, which closes valve 25 a small amount, decreasing the flow of water through branch conduit 23. At the same time, diaphragm motor 27 moves rod 28 to the left, which opens valve 24 a small amount, increasing the flow of gas through branch conduit 22. On the other hand, if the pressure in bore hole 10 decreases, the pressure drop will be reflected through tubing 17, pipe 26, and the diaphragm motors to actuate valves 24 and 25, thereby decreasing the volume of gas and increasing the volume of water being injected into formation 12.

The operation of the modifications illustrated in Figure 2 is identical to the operation of the apparatus in Figure 1, except that the pressure in pipe 26 acts upon diaphragm 34 against the action of spring 36 to change the opening of valves 24 and 25. If the pressure in pipe 26 increases, diaphragm plate 34 moves rod 37 to the right, opening valve 24 and closing valve 25 a desired amount. The operation of the modification shown in Figure 3 is similar to that of Figure 2. An increase in pressure in pipe 26 urges diaphragm 34 and stem 38 to the left against the action of spring 36. Stem 38 causes lever 39 to pivot at 41 moving rod 37 to the right, opening valve 24 and closing valve 25 a desired amount.

From the foregoing, it is believed that the construction and operation of the apparatus of my instant invention will be readily comprehended by persons skilled in the art. It is to be clearly understood, however, that various changes in the apparatus herewith shown and described may be resorted to without departing from the spirit of the invention as defined by the appended claims.

I claim:

1. Apparatus for use in the recovery of hydrocarbons from a partially depleted hydrocarbon-bearing formation that is penetrated by a well bore comprising means for transmitting fluid comprising a liquid component and a gaseous component into and downwardly through the well bore, and pressure actuated valve means for increasing the quantity of one component of the fluid and decreasing the quantity of the other component of the fluid transmitted into the well bore in response to a change in pressure in the lower portion of the well bore.

2. Apparatus for use in the recovery of hydrocarbons from a partially depleted hydrocarbon-bearing formation that is penetrated by a well bore comprising a conduit in the well bore for transmitting fluid comprising a liquid component and a gaseous component downwardly therethrough and into the formation, a second conduit in the well bore and communicating with the lower portion thereof, valve means in the first conduit, and pressure responsive valve actuation means connected to the valve means and subjected to the pressure in the second conduit, said last named means actuating the valve means to thereby increase the quantity of one component of the fluid and decrease the quantity of the other component of the fluid transmitted downwardly through the first conduit in response to a change in pressure in the lower portion of the well bore.

3. Apparatus for use in the recovery of hydrocarbons from a hydrocarbon-bearing formation that is penetrated by a well bore having casing therein comprising a liquid supply line, a gas supply line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure actuated valve means connected to the supply lines, said means communicating with the second conduit and being subjected to the pressure in the lower portion of the well bore therethrough, said means increasing the quantity of material transmitted into the first conduit by one supply line and decreasing the quantity of material transmitted into the first conduit by the other supply line in response to a change in pressure in the lower portion of the well bore.

4. Apparatus for use in the recovery of hydrocarbons from a hydrocarbon-bearing formation that is penetrated by a well bore having casing therein comprising a liquid supply line, a gas supply line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure actuated valve means connected to the supply lines, said means communicating with the second conduit and being subjected to the pressure in the lower portion of the well bore therethrough, said means increasing the quantity of liquid and decreasing the quantity of gas transmitted into the first conduit through the liquid supply line and the gas supply line, respectively, upon a drop in pressure in the lower portion of the well bore.

5. Apparatus for use in the recovery of hydrocarbons from a hydrocarbon-bearing formation that is penetrated by a well bore having casing therein comprising a liquid supply line, a gas supply line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure actuated valve means connected to the supply lines, said means communicating with the second conduit and being subjected to the pressure in the lower portion of the well bore therethrough, said means decreasing the quantity of liquid and increasing the quantity of gas transmitted into the first conduit through the liquid supply line and the gas supply line, respectively, upon a rise in pressure in the lower portion of the well bore.

6. Apparatus for use in the recovery of hydrocarbons from a hydrocarbon-bearing formation that is penetrated by a well bore having casing therein comprising a liquid supply line, a gas supply line, an adjustable flow valve in each line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure responsive valve actuation means connected to the valves, said means communicating with the second conduit and being subjected to the pressure in the lower portion of the well bore therethrough, said means adjusting the relative opening of the valves to increase the quantity of material transmitted into the first conduit by one supply line and decrease the quantity of material transmitted into the first conduit by the other supply line in response to a change in pressure in the lower portion of the well bore.

7. Apparatus for use in the recovery of hydrocarbons from a hydrocarbon-bearing formation that is penetrated by a well bore having casing therein comprising a liquid supply line, a gas supply line, an adjustable flow valve in each line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure responsive valve actuation means connected to the valves, said means communicating with the second conduit and being subjected to the pressure in the lower portion of the well bore therethrough, said means adjusting the relative opening of the valves to increase the quantity of liquid and decrease the quantity of gas transmitted into the first conduit by the liquid supply line and the gas supply line, respectively, upon a drop in pressure in the lower portion of the well bore.

3. Apparatus for use in the recovery of hydrocarbons from a hydrocarbon-bearing formation that is penetrated by a well bore having casing therein comprising a liquid supply line, a gas supply line, an adjustable flow valve in each line, a conduit communicating with both supply lines and extending downwardly through the casing for transmitting material from the supply lines into the formation, a second conduit extending downwardly through the casing, a packer between the conduits and the casing, both of the conduits communicating with the portion of the well bore below the packer, and pressure responsive valve actuation means connected to the valves, said means communicating with the second conduit and being subjected to the pressure in the lower portion of the well bore therethrough, said means adjusting the relative opening of the valves to decrease the quantity of liquid and increase the quantity of gas transmitted into the first conduit by the liquid supply line and the gas supply line, respectively, upon a rise in pressure in the lower portion of the well bore.

WILBUR J. CRITES.